UNITED STATES PATENT OFFICE.

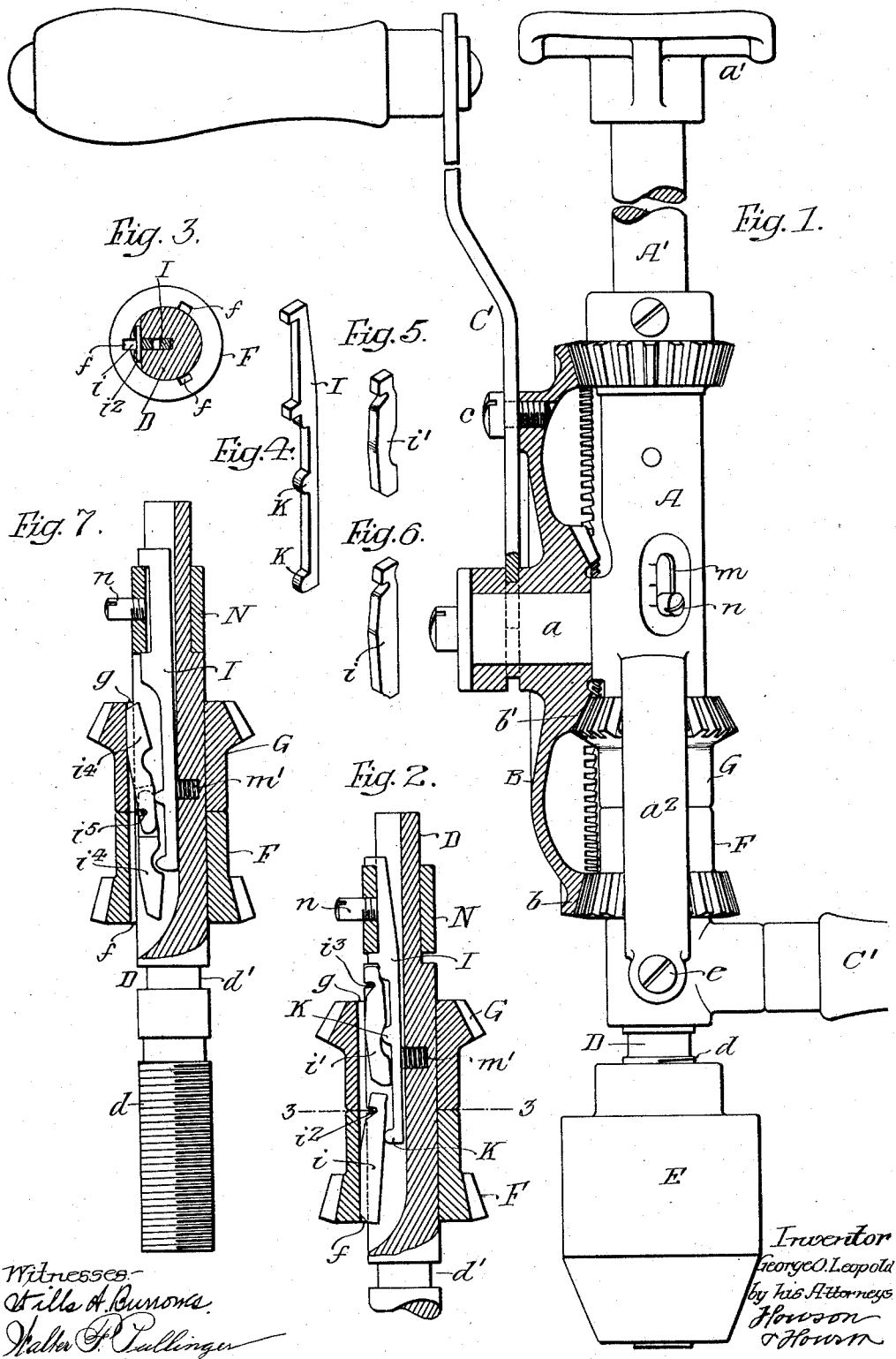

GEORGE O. LEOPOLD, OF PHILADELPHIA, PENNSYLVANIA, ASSIGNOR TO NORTH BRO'S. M'F'G. CO., OF PHILADELPHIA, PENNSYLVANIA, A CORPORATION OF PENNSYLVANIA.

GEARING.

1,015,235.  Specification of Letters Patent.  Patented Jan. 16, 1912.

Application filed October 10, 1911. Serial No. 653,871.

*To all whom it may concern:*

Be it known that I, GEORGE O. LEOPOLD, a citizen of the United States, residing in Philadelphia, Pennsylvania, have invented certain Improvements in Gearing, of which the following is a specification.

The object of this invention is to provide a simple and effective means for changing the speed of the spindle of a drill, or to lock the spindle so that it will not turn when the clutch is being opened or closed.

In the accompanying drawings:—Figure 1, is a side view of a breast drill showing the driving gear in section; Fig. 2, is a detached view showing the spindle and the two pinions is section; Fig. 3, is a transverse sectional view on the line 3—3, Fig. 2; Fig. 4, is a perspective view of the slide; Figs. 5 and 6, are detached perspective views of the pawls; and Fig. 7, is a sectional view illustrating a modification of the invention.

A is the frame of the drill having a stud $a$ on which is mounted the driving wheel B having two series of teeth $b$, $b'$. C is a handle secured to the driving wheel B in any suitable manner, in the present instance this handle is forked and adapted to a recess in the hub of the wheel B, and is secured in position by screw $c$. Projecting from the opposite side of the frame A is a handhold $C'$.

Secured to the frame A is a post $A'$ which is provided with a breast piece $a'$. The inner end of this post forms an abutment for the spindle D which is mounted in the frame A. The lower end of the spindle D is screw threaded at $d$, and E is a chuck adapted to the screw threaded end of the spindle. On turning the body of the chuck in one direction the jaws will be opened, and on turning it in the opposite direction the jaws will be closed. In the spindle is an annular groove $d'$ into which extends a screw $e$ which passes through an opening in the frame A and confines the spindle in the frame. The lower portion of the frame is connected to the upper portion by integral straps $a^2$ which are so spaced apart as to allow the two pinions F and G, which are loosely mounted on the spindle, to turn freely. The pinion F has teeth which mesh with the teeth $b$ which are near the periphery of the driving wheel B, while the pinion G has teeth which mesh with the teeth $b'$ near the hub of said wheel B. Both pinions turn as the driving wheel B is turned, and the pinion F travels at a greater speed than the pinion G. Both pinions are loosely mounted on the spindle D and I provide mechanism whereby either one or the other of the pinions is locked to the spindle, or when it is desired to secure the spindle against turning then the means is so shifted that both pinions are locked to the spindle.

Referring to Fig. 2, $i$, $i'$ are two pawls, pivoted at $i^2$ and $i^3$, respectively, and I is a slide adapted to a longitudinal slot in the spindle D. This slide has projections K, K which rest back of the pawls $i$, $i'$ and when the slide is moved they actuate the pawls so as to force them into notches $f$ and $g$ in the pinions F and G, respectively. On the reduced portion of the spindle D is a collar N and the slide I has lugs which project at each end of the collar. Projecting from the collar is a pin $n$ which extends through a slot $m$ in the frame A, so that when the pin is in the lowest position, as illustrated in Fig. 1, the pinion F is locked to the spindle and the spindle will be driven at high speed. When the pin is shifted to the extreme position in the opposite direction then the pawls are so shifted that the pinion G is locked to the spindle and the spindle will then be driven at slow speed. When the pin $n$ is in mid-position then both pawls project into the slots in their pinions and both pinions are thus locked to the spindle and, as both are geared to the driving wheel and travel at different speeds, the spindle will be locked to the frame. The construction enables the user to turn the shell of the chuck to open and close the jaws without having to hold any of the moving parts with one hand. The slide is held against the pawls in the present instance by a coiled spring $m'$, and this spring has sufficient tension to hold the collar and the slide in the position to which they are adjusted.

In Fig 7, I have illustrated a modification in which the pawls $i^4$ are mounted on the same pivot pin $i^5$; the back of each pawl being so shaped that when the slide I is shifted one pawl will be retracted as the other is projected.

I claim:—

1. The combination in a drill, of a frame; a spindle mounted therein; two pinions loosely mounted on the spindle; a driving wheel having two sets of teeth, one set meshing with one pinion and the other set meshing with the other pinion, said spindle being grooved; a slide located in the groove; two pawls pivotally mounted in the groove and actuated by the slide, one pawl engaging one pinion and the other engaging the other pinion; and means for shifting the slide so that either one or the other of the pinions will be locked to the spindle, or both will be locked to the spindle.

2. The combination of a spindle; two pinions mounted thereon, said spindle being slotted; a longitudinally movable slide mounted in the slot; a collar secured to the slide; projections on the slide; two pawls pivotally mounted in the slot and actuated by the projections on the slide; a spring mounted within the spindle resting against the slide; with a gear wheel having two sets of teeth, one set meshing with one pinion and the other set meshing with the other pinion.

3. The combination in a breast drill, of a frame; a driving wheel mounted thereon; a spindle; two pinions loosely mounted on the spindle and meshing with the teeth of the driving wheel, said spindle and pinions being slotted; a slide in the slot in the spindle; two pawls independently pivoted in the slot and arranged to be projected into the slots of their respective pinions; a spring acting to force the slide toward the pinions; and a sleeve secured to the slide and projecting through an opening in the frame.

In testimony whereof, I have signed my name to this specification, in the presence of two subscribing witnesses.

GEORGE O. LEOPOLD.

Witnesses:
Jos. H. Klein,
Wm. A. Barr.

---

Copies of this patent may be obtained for five cents each, by addressing the "Commissioner of Patents, Washington, D. C."